Patented May 26, 1925.

UNITED STATES PATENT OFFICE.

ROBERT T. GILLETTE, OF SCHENECTADY, NEW YORK, ASSIGNOR TO GENERAL ELECTRIC COMPANY, A CORPORATION OF NEW YORK.

WELDING ELECTRODE.

No Drawing.   Application filed July 30, 1924.   Serial No. 729,169.

*To all whom it may concern:*

Be it known that I, ROBERT T. GILLETTE, a citizen of the United States, residing at Schenectady, in the county of Schenectady, State of New York, have invented certain new and useful Improvements in Welding Electrodes, of which the following is a specification.

My invention relates to electrodes and more particularly to electrodes for electric welding by the resistance welding process commonly referred to as spot welding and line welding and also to electrodes for heating and upsetting rivets and the like.

In spot welding the work is commonly clamped between a pair of electrodes which exert a heavy pressure upon the work and conduct the welding current through the work, the work being brought to a welding temperature by the heating effect of the current in the work and the parts of the work being brought into molecular union by the pressure exerted upon the electrodes. In order to localize the heating effect at the desired spot the electrodes are of comparatively small contact area. In line welding, the welding current is conducted through the work by means of a pair of roller electrodes pressed against opposite sides of the work. In some cases but one roller electrode is used, a conducting mandrel being substituted for the other electrode. In this case also the contact area between the electrode and the work is relatively small in order to localize the heat and pressure. The welding currents required are relatively heavy and the current density in the electrodes in both spot and line welding is relatively high. Heretofore such welding electrodes have customarily been made of copper for the reason that copper has a low resistance and good heat conductivity. The copper electrode thus makes a good electrical contact with the surface of the work and the heating of the electrode itself by the current passing therethrough is reduced. Copper, however, has a relatively low compressive strength and the surfaces of the roller electrodes become mushroomed or deformed with continued use and this deformation is more rapid when the electrodes heat up since the copper then becomes softer. It is therefore necessary in order to secure mechanical strength, particularly as the work becomes heavier, to use electrodes of a larger contact area than is desirable for the best localization of the heating effect between the articles to be welded together. The larger contact area moreover requires a larger pressure to bring the surfaces of the work into intimate engagement. The life of copper electrodes can be increased by resorting to water-cooling, but even by such means the electrodes can be used but for a limited time without redressing. With the heavy currents used, there is also unavoidably some sparking and sputtering between the surface of spot welding electrodes and the work and with copper electrodes there is some tendency for the electrodes to stick to the work which causes pitting of the electrodes, thereby further reducing the life of the electrodes. In line welding machines the copper roller electrodes at times tend to pick up metal from the work due to this sticking tendency. This not only reduces the life of the electrode but destroys the effectiveness of the weld, particularly when welding thin sheets.

An object of my invention is to provide a welding electrode for spot and line welding machines and an electrode for heating and exerting pressure upon articles such as rivets and the like which electrode has good conductivity, which is capable of operation under high pressure without deformation, which will withstand high temperature without softening and which has little or no tendency to stick to the work.

Electrodes made in accordance with my invention consist of particles of hard, wear-resisting material, such, for example, as tungsten or molybdenum and a soft malleable metal, such as copper, which is not appreciably alloyable with the harder metal, the mixture being intimately commingled and consolidated to form a homogeneous, coherent body. Preferably I make the electrodes of porous tungsten impregnated with copper. This material may be made as described in Letters Patent of the United States to Nathan H. Adams, No. 1,477,797, December 18, 1923. As there described, the material may be made by intimately mixing about 9 parts by weight of finely divided metallic tungsten with about 1 part of finely divided copper. The mixture is consolidated by pressure to form a coherent body and the resultant material is fired, preferably in a hydrogen atmosphere, at a temperature of 1200° to 1600° C., that is, above the fusion point of the binder metal. The material may also be made in other ways. For example, as set forth in the application of Nathan H. Adams, Serial No. 759,213, filed December 3, 1924, and assigned to the same assignee as this application, wherein one method disclosed comprises fashioning the powdered tungsten into the desired shape by high pressure, as in a hydraulic press, the compressed mass then being heated in a hydrogen atmosphere to a suitable temperature partially to sinter the mass without shrinking the mass to such an extent as to destroy the porosity, the mass then being placed in a graphite box with a suitable surplus of copper and again heated in a hydrogen atmosphere to a temperature sufficient to cause the copper to become fluid and soak into and fill the voids in the porous body, any excess copper then being machined from the exterior of the article.

This material may be readily machined and is capable of resisting high pressure without deformation. An electrode made of this material maintains a high resistance against deformation even when hot and has little or no tendency to stick to or pick up metal from the work.

In my opinion, the tungsten provides a hard, pressure and wear-resisting skeleton and the copper acts both as a binder and a good conductor of heat and electricity.

In spot welding and line welding machines, it is not customary to break the welding circuit at the welding electrode. A switch is customarily provided for controlling the flow of welding current and the circuit is interrupted at the switch before the electrodes are separated from the work. It is desirable to use this method of operation with my improved electrode, since, while the electrode will successfully withstand whatever sparking that may take place while welding, and will successfully withstand bringing the electrodes into contact with the work while the welding circuit is energized, the arcing which would take place, were it attempted to break the welding circuit at the electrodes, would have a deleterious action on the electrodes.

When in the appended claims specific reference is made to tungsten, I desire thereby also to include equivalent hard, pressure and wear-resisting materials, as for example molybdenum, suitable for use in a welding electrode.

What I claim as new and desire to secure by Letters Patent of the United States, is:—

1. A welding electrode for electric welding by the resistance process comprising an intimate mixture of tungsten and copper, consolidated to form a pressure-resisting composite material capable of operation under high pressure and at high temperature without deformation.

2. A welding electrode for electric welding by the resistance process comprising an intimate mixture of about nine parts of tungsten and one part of copper by weight, said mixture constituting a coherent pressure-resisting material capable of operation under high pressure and at high temperature without deformation.

3. A conducting pressure exerting electrode of the class described consisting of porous tungsten impregnated with copper.

In witness whereof, I have hereunto set my hand this 29th day of July, 1924.

ROBERT T. GILLETTE